(12) United States Patent
Lin (10) Patent No.: US 11,944,072 B1
(45) Date of Patent: Apr. 2, 2024

(54) INTELLIGENT BIRD FEEDING OBSERVATION DEVICE

(71) Applicant: Quanzhou Wentelai Import and Export Trade Co., Ltd, Quanzhou (CN)

(72) Inventor: Jiahao Lin, Quanzhou (CN)

(73) Assignee: Quanzhou Wentelai Import and Export Trade Co., Ltd, Quanzhou (CN)

( * ) Notice: Subject to any disclaimer, the term of this patent is extended or adjusted under 35 U.S.C. 154(b) by 0 days.

(21) Appl. No.: 18/481,457

(22) Filed: Oct. 5, 2023

(30) Foreign Application Priority Data

Sep. 8, 2023 (CN) .......................... 202322447475.2

(51) Int. Cl.
| | |
|---|---|
| *A01K 29/00* | (2006.01) |
| *A01K 39/012* | (2006.01) |
| *H04N 23/54* | (2023.01) |
| *H04N 23/57* | (2023.01) |
| *H04N 23/695* | (2023.01) |

(52) U.S. Cl.
CPC .......... *A01K 29/005* (2013.01); *A01K 39/012* (2013.01); *H04N 23/54* (2023.01); *H04N 23/57* (2023.01); *H04N 23/695* (2023.01)

(58) Field of Classification Search
CPC .. A01K 39/012; A01K 39/01; A01K 39/0125; A01K 39/04; A01K 39/0106; A01K 39/0113; A01K 29/005
See application file for complete search history.

(56) References Cited

U.S. PATENT DOCUMENTS

| | | | | |
|---|---|---|---|---|
| 3,295,498 A | * | 1/1967 | Brown | A01K 31/14 119/52.2 |
| 5,289,796 A | | 3/1994 | Armstrong | |
| 6,016,768 A | * | 1/2000 | Colucci | A01K 39/0113 119/57.9 |
| 6,269,771 B1 | * | 8/2001 | Cotter | A01K 39/0113 119/57.9 |
| 2010/0031890 A1 | | 2/2010 | Vosbikian | |
| 2014/0182518 A1 | * | 7/2014 | Boehm | A01K 31/007 119/429 |
| 2015/0181801 A1 | * | 7/2015 | Niemela | A01C 17/001 119/51.01 |
| 2016/0156989 A1 | * | 6/2016 | Lovett | H04N 7/183 348/143 |
| 2017/0195551 A1 | * | 7/2017 | Klein | H04N 7/188 |
| 2022/0295756 A1 | | 9/2022 | Crass | |
| 2023/0027590 A1 | * | 1/2023 | Hu | G06V 40/103 |
| 2023/0270078 A1 | * | 8/2023 | Buzzard | A01K 39/014 119/468 |

* cited by examiner

*Primary Examiner* — Trinh T Nguyen (57) ABSTRACT

An intelligent bird feeding observation device, including: a storage bin, wherein a top of the storage bin is provided with a feed inlet, and two opposite sides of the storage bin are provided with a sliding groove of which one end penetrates through the storage bin; a cover body, wherein the cover body is movably covered on the feed inlet of the storage bin through a rotating shaft, and the rotating shaft is positioned in the sliding groove; a tray, wherein the tray is arranged at a bottom of the storage bin, the tray is provided with a feeding cavity with an opening at the top, and the storage bin covers part of the feeding cavity and is communicated with the feeding cavity; and a camera module, wherein the camera module is arranged on the storage bin and photographs towards the feeding cavity of the tray.

18 Claims, 7 Drawing Sheets

INTELLIGENT BIRD FEEDING OBSERVATION DEVICE

TECHNICAL FIELD

The present utility model relates to the technical field of bird observation devices, and in particular, to an intelligent bird feeding observation device.

BACKGROUND

As an emerging leisure and scientific research activity, observing the habits of wild birds has attracted the participation of an increasing number of enthusiasts and professional researchers. The application of bird observation devices has also become an indispensable part of this field. These devices can help people better observe and understand the behavior and ecological habits of wild birds.

To attract more birds to the observation area, people usually attract the birds by putting bird food, so wild bird feeders came into being. People put bird food in the feeders and set up cameras on or around the feeders to monitor the birds in the observation area in real time. During the observation process, to observe the birds for a long time, it is necessary to add bird food to the feeders irregularly to continuously attract the birds into the observation area. However, a cover body of a conventional feeder is buckled or hinged on a main body of the feeder, and when the bird food is replenished, the cover body of the feeder needs to be manually removed or opened. Consequently, the feeder is complex in operation and inconvenient to use.

SUMMARY

A primary objective of the present utility model is to provide an intelligent bird feeding observation device, which aims to solve the technical problem that the existing intelligent bird feeding observation device is low in practicability.

To achieve the objective, the present utility model provides an intelligent bird feeding observation device, which comprises:
- a storage bin, wherein a top of the storage bin is provided with a feed inlet, and two opposite sides of the storage bin are provided with a sliding groove of which one end penetrates through the storage bin;
- a cover body, wherein the cover body is movably covered on the feed inlet of the storage bin through a rotating shaft, and the rotating shaft is positioned in the sliding groove;
- a tray, wherein the tray is arranged at a bottom of the storage bin, the tray is provided with a feeding cavity with an opening at the top, and the storage bin covers part of the feeding cavity and is communicated with the feeding cavity; and
- a camera module, wherein the camera module is arranged on the storage bin and photographs towards the feeding cavity of the tray.

Optionally, the sliding groove comprises a track groove with one end penetrating through the storage bin and a limiting groove communicated with the other end of the track groove, and the limiting groove has a diameter that is greater than a width of the track groove; and
- a shape of the rotating shaft is adapted to the limiting groove, and a side wall of the rotating shaft has at least one limiting surface adapted to the track groove.

Optionally, the sliding groove is arranged downwards from the top of the storage bin, and the limiting groove is positioned at a bottom of the track groove.

Optionally, the cover body has a covering surface covering the feed inlet, and the limiting surface is arranged parallel to the covering surface.

Optionally, the cover body comprises a first fixing plate adapted to a shape of the storage bin, the rotating shaft is arranged on an inner wall of the first fixing plate, and the first fixing plate is attached to an outer wall of the storage bin and extends downward.

Optionally, the cover body comprises a second fixing plate adapted to a shape of the feed inlet, the second fixing plate is attached to an inner wall of the storage bin and extends downward, and the storage bin around the feed inlet is positioned between the first fixing plate and the second fixing plate.

Optionally, the cover body further comprises a first covering plate covering the feed inlet and a second covering plate connected to the first covering plate, and the first fixing plate and the second fixing plate are fixed onto the first covering plate.

Optionally, the cover body further comprises triangular fixing plates arranged on opposite sides of the first covering plate and the second covering plate, and two adjacent short sides of the triangular fixing plates are fixedly connected to the first covering plate and the second covering plate, respectively.

Optionally, the first fixing plate is provided with a buckle hole, and the storage bin is provided with a buckle that is matched with the buckle hole.

Optionally, the storage bin comprises a housing and a mounting plate, the housing and the mounting plate enclose the storage bin, a bottom of the mounting plate extends towards the feeding cavity to divide the feeding cavity into a storage chamber communicated with the storage bin and a feeding chamber for feeding, and the mounting plate is provided with a discharge hole communicated with the storage chamber and the feeding chamber.

Optionally, a middle of the mounting plate is recessed to form a mounting groove, the camera module comprises a control module and a camera electrically connected to the control module, and the control module and the camera are arranged in the mounting groove.

Optionally, the camera module further comprises an antenna module, the housing is provided with a mounting hole communicated with the mounting groove, and the antenna module is arranged on an outer wall of the housing and electrically connected to the control module through the mounting hole.

Optionally, the camera module further comprises a driving assembly electrically connected to the control module, and the driving assembly is used to drive the camera to rotate.

Optionally, the observation device further comprises a rotating assembly, the rotating assembly comprises a fixed support, a first rotating member arranged on the fixed support, and a second rotating member rotatably matched with the first rotating member, and the second rotating member is fixed to a bottom of the tray so as to rotate the tray relative to the fixed support.

Optionally, the second rotating member is cylindrical, the first rotating member is provided with a rotating groove adapted to the second rotating member, a bottom of the rotating groove is provided with a fixing hole, and the second rotating member is fixedly connected to the tray through the fixing hole.

Optionally, an outer wall surface of the second rotating member is provided with at least one fixed elastic piece, the fixed elastic piece is provided with a clamping block protruding from the outer wall surface of the second rotating member, and an inner wall surface of the rotating groove is provided with a plurality of clamping grooves at intervals for matching with the clamping block.

Optionally, the bottom of the tray is provided with a fixed base, and the second rotating member is fixed to the fixed base.

Optionally, the observation device further comprises a standing frame, and the standing frame is fixed to one side of the tray.

Optionally, the observation device further comprises at least one honey pot, at least one fixed thorn and at least one food cage, and the honey pot, the fixed thorn and the food cage all are provided on the standing frame.

According to the technical solution of the present utility model, the tray is arranged at the bottom of the storage bin, the camera module is arranged on the storage bin and photographs towards the feeding cavity of the tray, a top of the storage bin is provided with the feed inlet, two opposite sides of the storage bin are provided with a sliding groove that is used to assemble the cover body, the cover body is provided with the rotating shaft, and the rotating shaft of the cover body is assembled into the sliding groove from a mounting opening of the sliding groove, so that the cover body is limited on the storage bin, the rotating shaft is limited in the sliding groove, and the cover body is assembled and matched. During operation, the cover body needs to be merely rotated to complete bird food replenishment without additional disassembly steps. At the same time, when the cover body needs to be disassembled, the rotating shaft on the cover body only slides out along the sliding groove, and the disassembly of the cover body can be completed. This design simplifies the operation process, which greatly saves the time and the energy of a user, and effectively improves the practicability of the intelligent bird feeding observation device.

BRIEF DESCRIPTION OF DRAWINGS

To more clearly illustrate the technical solutions in the embodiments of the present utility model or in the prior art, the drawings required to be used in the description of the embodiments or the prior art are briefly introduced below. It is obvious that the drawings in the description below are only some embodiments of the present utility model, and those of ordinary skill in the art can obtain other drawings according to structures illustrated in these drawings without creative efforts.

| Reference numeral | Name | Reference numeral | Name |
| --- | --- | --- | --- |
| 10 | Storage bin | 20 | Cover body |
| 11 | Feed inlet | 21 | Covering surface |
| 12 | Sliding groove | 22 | First fixing plate |
| 121 | Track groove | 221 | Elastic plate |
| 122 | Limiting groove | 222 | Movable groove |
| 123 | Mounting opening | 223 | Buckle hole |
| 13 | Buckle | 23 | Second fixing plate |
| 14 | Housing | 25 | First covering plate |
| 15 | Mounting plate | 26 | Second covering plate |
| 151 | Discharge hole | 27 | Water guide groove |
| 152 | Mounting groove | 28 | Triangular fixing plate |
| 30 | Tray | 29 | Rotating shaft |
| 31 | Feeding cavity | 291 | Limiting surface |
| 311 | Storage chamber | 40 | Rotating assembly |
| 312 | Feeding chamber | 41 | Fixed support |
| 32 | Water permeable hole | 42 | First rotating member |
| 33 | Fixed base | 421 | Rotating groove |
| 51 | Camera | 422 | Fixing hole |
| 52 | Antenna module | 423 | Clamping groove |
| 60 | Standing frame | 43 | Second rotating member |
| 70 | Honey pot | 431 | Fixed elastic piece |
| 80 | Fixed thorn | 432 | Clamping block |
| 90 | Food cage | | |

The implementation of the objectives, the functional features, and the advantages of the present utility model will be further explained in conjunction with the embodiments and with reference to the drawings.

DETAILED DESCRIPTION OF EMBODIMENTS

The technical solutions in the embodiments of the present utility model will be clearly and completely described below with reference to the drawings in the embodiments of the present utility model. It is apparent that the described embodiments are only some, but not all, embodiments of the present utility model. Based on the embodiments of the present utility model, all other embodiments obtained by those of ordinary skill in the art without creative efforts fall within the protection scope of the present utility model.

It should be noted that, if directional indications (such as upper, lower, left, right, front and rear) are involved in the embodiments of the present utility model, the directional indications are only used to explain the relative position relationships, the motion situations and the like between individual components under a certain pose (as shown in the drawings), and if the certain pose is changed, the directional indications are changed accordingly.

In addition, if there are descriptions relating to "first", "second" and the like in the embodiments of the present utility model, the descriptions of "first", "second" and the like are for descriptive purposes only and are not to be construed as indicating or implying relative importance thereof or implicitly indicating the quantities of technical features indicated. Thus, a feature defined by "first" or "second" may explicitly or implicitly include at least one such feature. In addition, "and/or" appearing herein is meant to include three parallel solutions, and taking "A and/or B" as an example, it includes solution A, solution B, or both solution A and solution B. In addition, the technical solutions among various embodiments may be combined with each other, however, this combination must be based on that it can be realized by those of ordinary skill in the art. When the combination of the technical solutions is contradictory or cannot be implemented, such a combination of the technical solutions should not be considered to exist, and is not within the protection scope of the present utility model.

The present utility model provides an intelligent bird feeding observation device.

In an embodiment of the present utility model, as shown in FIGS. 1 to 9, the intelligent bird feeding observation device comprises:

a storage bin 10, wherein a top of the storage bin 10 is provided with a feed inlet 11, and two opposite sides of the storage bin 10 are provided with a sliding groove 12 of which one end penetrates through the storage bin 10;

a cover body 20, wherein the cover body 20 is movably covered on the feed inlet 11 of the storage bin 10 through a rotating shaft 29, and the rotating shaft 29 is positioned in the sliding groove 12;

a tray 30, wherein the tray 30 is arranged at a bottom of the storage bin 10, the tray 30 is provided with a feeding cavity 31 with an opening at the top, and the storage bin 10 covers part of the feeding cavity 31 and is communicated with the feeding cavity 31; and a camera module, wherein the camera module is arranged on the storage bin 10 and photographs towards the feeding cavity 31 of the tray 30.

In this embodiment, the storage bin 10 is used to store bird food, the feed inlet 11 is positioned at the top of the storage bin 10, the sliding groove 12 is arranged on the outer wall surface of the storage bin 10 for mounting and fixing the cover body 20, wherein one end of the sliding groove 12 penetrates through the storage bin 10 to form a mounting opening 123, the rotating shaft 29 is assembled into the sliding groove 12 from the mounting opening 123, the mounting opening 123 may be arranged on the side wall of the storage bin 10, or may be arranged at the top of the storage bin 10, which is not specifically limited herein.

The cover body 20 is used to open or close the feed inlet 11, a rotating shaft 29 is arranged on the cover body 20, the rotating shaft 29 is assembled into the sliding groove 12 from the mounting opening 123 and is limited in the sliding groove 12, and the cover body 20 may rotate around the rotating shaft 29, so that the feed inlet 11 is opened or closed.

The tray 30 is positioned at the bottom of the storage bin 10 and is fixedly connected to the storage bin 10. The tray 30 has a feeding cavity 31, and the top of the feeding chamber 31 is provided with an opening through which birds can enter the feeding cavity 31 to eat food. The storage bin 10 covers part of the feeding cavity 31 and is communicated with the feeding cavity 31, so that the bird food in the storage bin 10 enters the feeding cavity 31.

The camera module is used to photograph the feeding status of the birds in the feeding cavity 31 and photograph the environmental conditions around the observation device, the camera module is specifically mounted on the storage bin 10 and can rotate to adjust the photographing angle on the storage bin 10, which is not specifically limited herein.

According to the technical solution of the present utility model, the tray 30 is arranged at the bottom of the storage bin 10, the camera module is arranged on the storage bin 10 and photographs towards the feeding cavity 31 of the tray 30, a top of the storage bin 10 is provided with the feed inlet 11, two opposite sides of the storage bin 10 are provided with a sliding groove 12, the sliding groove 12 is used to assemble the cover body 20, the cover body 20 is provided with the rotating shaft 29, and the rotating shaft 29 of the cover body 20 is assembled into the sliding groove 12 from a mounting opening 123 of the sliding groove 12, so that the cover body 20 is limited on the storage bin 10, the rotating shaft 29 is limited in the sliding groove 12, and the cover body 20 is assembled and matched. During operation, the cover body 20 needs to be merely rotated to complete bird food replenishment without additional disassembly steps. At the same time, when the cover body 20 needs to be disassembled, the rotating shaft 29 on the cover body 20 only slides out along the sliding groove 12, and the disassembly of the cover body 20 can be completed. This design simplifies the operation process, which greatly saves the time and the energy of a user, and effectively improves the practicability of the intelligent bird feeding observation device.

Further, as shown in FIGS. 2 to 5, the sliding groove 12 comprises a track groove 121 with one end penetrating through the storage bin 10 and a limiting groove 122 communicated with the other end of the track groove 121, and the limiting groove 122 has a diameter that is greater than a width of the track groove 121; and a shape of the rotating shaft 29 is adapted to the limiting groove 122, and a side wall of the rotating shaft 29 has at least one limiting surface 291 adapted to the track groove 121. In this embodiment, the track groove 121 is used to guide, and the limiting groove 122 is used to limit the movement of the rotating shaft 29. Specifically, a maximum diameter of the limiting groove 122 is greater than a width of the track groove 121, and meanwhile, a shape of the rotating shaft 29 is adapted to a shape of the limiting groove 122. It can be understood that a maximum diameter of a cross section of the rotating shaft 29 is greater than a width of the track groove 121 and less than a maximum diameter of the limiting groove 122, and meanwhile, a limiting surface 291 is arranged on a side wall of the rotating shaft 29, so that the rotating shaft 29 has a minimum diameter of a cross section, and the minimum diameter of the cross section of the rotating shaft 29 is less than the width of the track groove 121, when the maximum diameter of the cross section of the rotating shaft 29 intersects with a length direction of the track groove 121, the rotating shaft 29 is limited in the limiting groove 122, and when the maximum diameter of the cross section of the rotating shaft 29 is approximately parallel to the length direction of the track groove 121, the rotating shaft 29 may move into the track groove 121, so as to achieve the disassembly of the cover body 20.

Further, as shown in FIGS. 2 to 5, the sliding groove 12 is arranged downwards from the top of the storage bin 10, and the limiting groove 122 is positioned at a bottom of the track groove 121. In this embodiment, the sliding groove 12 can be arranged downward from the top of the storage bin 10, and can also be arranged horizontally from the side wall of the storage bin 10, preferably, the sliding groove 12 is arranged downward from the top of the storage bin 10, so that when the cover body 20 is assembled by a user, the mounting opening 123 of the sliding groove 12 is positioned in the visual range of the user, and the assembly of the rotating shaft 29 and the positioning of the cover body 20 are more convenient without bending down or lowering the head by the user. Meanwhile, when the rotating shaft 29 is positioned in the limiting groove 122, the cover body 20 will not move horizontally due to an external force received by the storage bin 10, thereby effectively improving the structural stability of the observation device.

Figure 4:
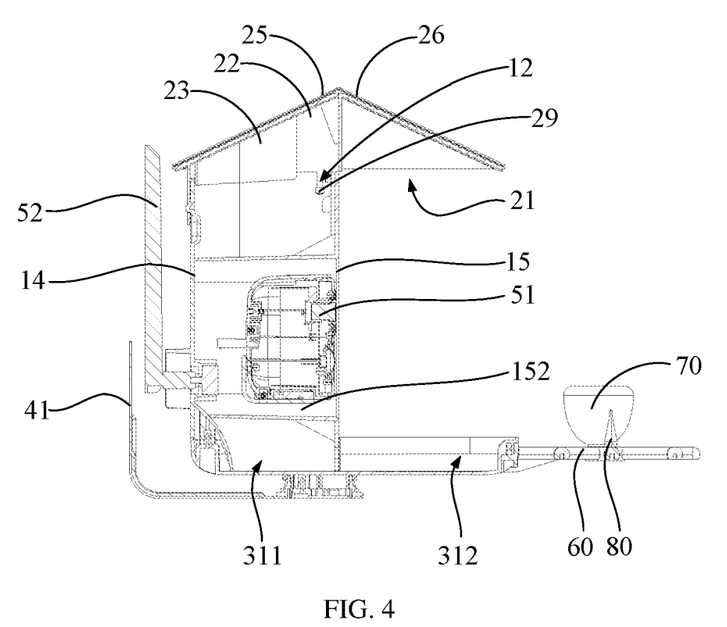
FIG. 4 is a schematic diagram of a cross-sectional structure of an intelligent bird feeding observation device according to the present utility model from an angle.
Figure 5:
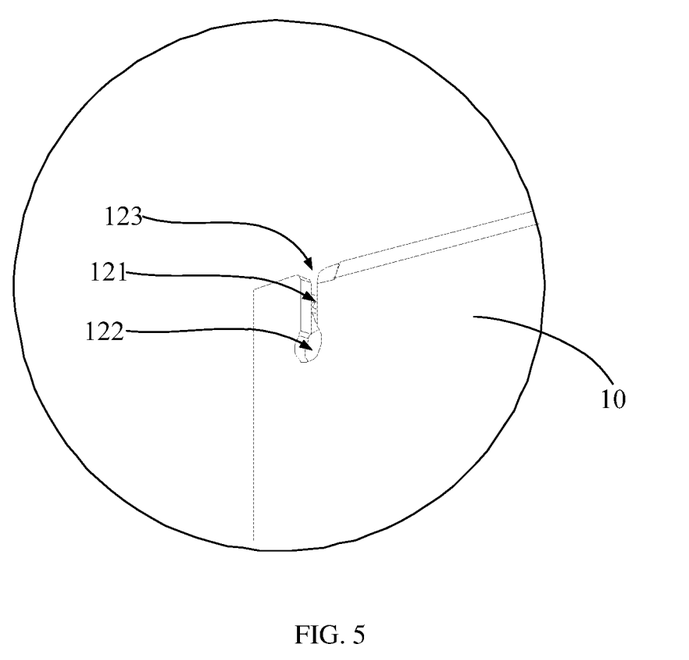
FIG. 5 is an enlarged view of part A in FIG. 3.

Further, as shown in FIG. 4, the cover body 20 has a covering surface 21 covering the feed inlet 11, and the limiting surface 291 is arranged parallel to the covering surface 21. In this embodiment, the covering surface 21 is a bottom surface of the cover body 20 and is used to cover the feed inlet 11, and the limiting surface 291 of the rotating shaft 29 is arranged in parallel with the covering surface 21 of the cover body 20. It can be understood that when the cover body 20 closes the feed inlet 11, the rotating shaft 29 is limited in the limiting groove 122, the cover body 20 cannot move in a horizontal direction and a vertical direction, and when the cover body 20 opens the feed inlet 11, the rotating shaft 29 can move along a vertical direction of the track groove 121, so as to facilitate the assembly and disassembly of the cover body 20, thereby effectively improving the assembly convenience of the observation device.

Further, as shown in FIGS. 3, 4, 6, and 7, the cover body 20 comprises a first fixing plate 22 adapted to a shape of the storage bin 10, the rotating shaft 29 is arranged on an inner wall of the first fixing plate 22, and the first fixing plate 22 is attached to an outer wall of the storage bin 10 and extends downward. In this embodiment, the first fixing plate 22 is used to provide a mounting position for the rotating shaft 29. The rotating shaft 29 is arranged on an inner wall of the first fixing plate 22. Therefore, when the cover body 20 closes the feed inlet 11, an inner wall surface of the first fixing plate 22 is attached to an outer wall surface of the storage bin 10. Meanwhile, the downward extension of the first fixing plate 22 relative to the feed inlet 11 can increase the coverage of the first fixing plate 22 and effectively prevent the backflow of rainwater in rainy weather, thereby improving the practicality of the observation device.

Further, the cover body 20 comprises a second fixing plate 23 adapted to a shape of the feed inlet 11, the second fixing plate 23 is attached to an inner wall of the storage bin 10 and extends downward, and the storage bin 10 around the feed inlet 11 is positioned between the first fixing plate 22 and the second fixing plate 23. In this embodiment, the second fixing plate 23 is a thin plate adapted to a shape of the feed inlet 11. The second fixing plate 23 is attached to the inner wall of the storage bin 10 and extends downward to provide additional coverage and fixing surface for the feed inlet 11 to prevent interference from the external environment from entering the storage bin 10. Specifically, a peripheral area of the feed inlet 11 is clamped by the first fixing plate 22 and the second fixing plate 23, thereby forming a protective space, which helps prevent foreign matter, wind, rain, and the like from entering the feed inlet 11. Therefore, the safety of the food in the storage bin 10 and the observation device is protected.

In addition, a plurality of fixing blocks are arranged between the first fixing plate 22 and the second fixing plate 23 at intervals, and two opposite sides of each fixing block are respectively fixed on surfaces of the first fixing plate 22 and the second fixing plate 23, so that the structural stability of the first fixing plate 22 and the second fixing plate 23 is effectively improved.

Further, the cover body 20 further comprises a first covering plate 25 covering the feed inlet 11 and a second covering plate 26 connected to the first covering plate 25, and the first fixing plate 22 and the second fixing plate 23 are fixed onto the first covering plate 25. Meanwhile, the cover body 20 further comprises triangular fixing plates 28 arranged on opposite sides of the first covering plate 25 and the second covering plate 26, and two adjacent short sides of the triangular fixing plates 28 are fixedly connected to the first covering plate 25 and the second covering plate 26, respectively, so that the structural stability of the cover body 20 is effectively improved.

Figure 7:
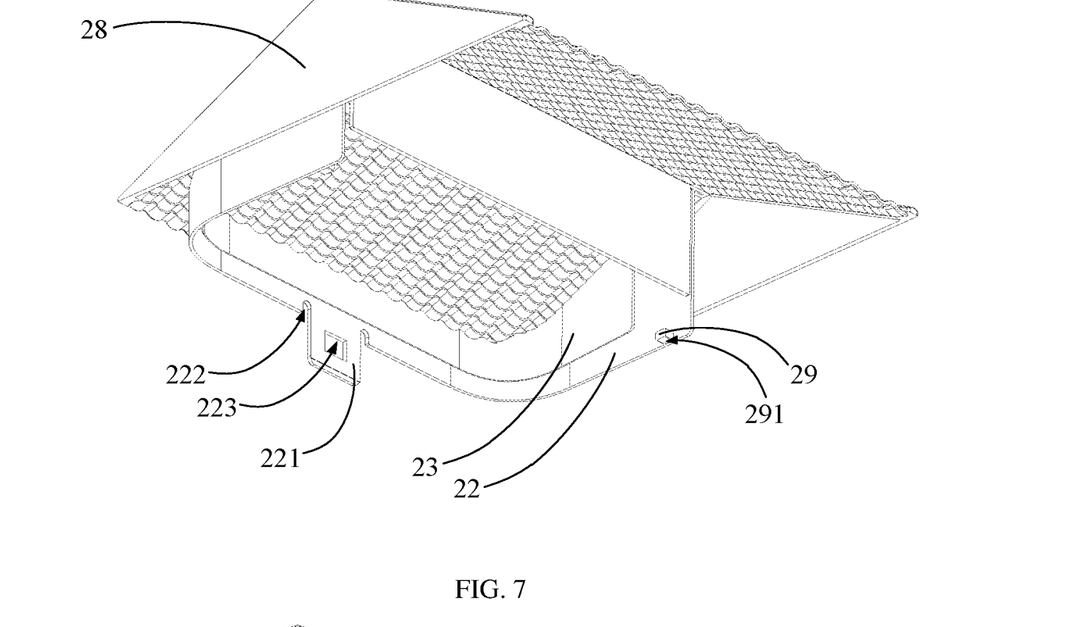
FIG. 7 is a schematic diagram of a structure of a cover body.

In addition, the top of the first covering plate 25 and the second covering plate 26 are provided with water guiding grooves 27 at intervals.

Further, as shown in FIGS. 3, 4, 6, and 7, the first fixing plate 22 is provided with a buckle hole 223, and the storage bin 10 is provided with a buckle 13 that is matched with the buckle hole 223. In this embodiment, the cover body 20 and the storage bin 10 are fixed by a buckle 13. Specifically, a buckle hole 223 is arranged on the first fixing plate 22, the buckle 13 is arranged on the storage bin 10, and when the cover body 20 closes the feed inlet 11, the buckle hole 223 is matched with the buckle 13 to fix the cover body 20 on the storage bin 10.

Figure 6:
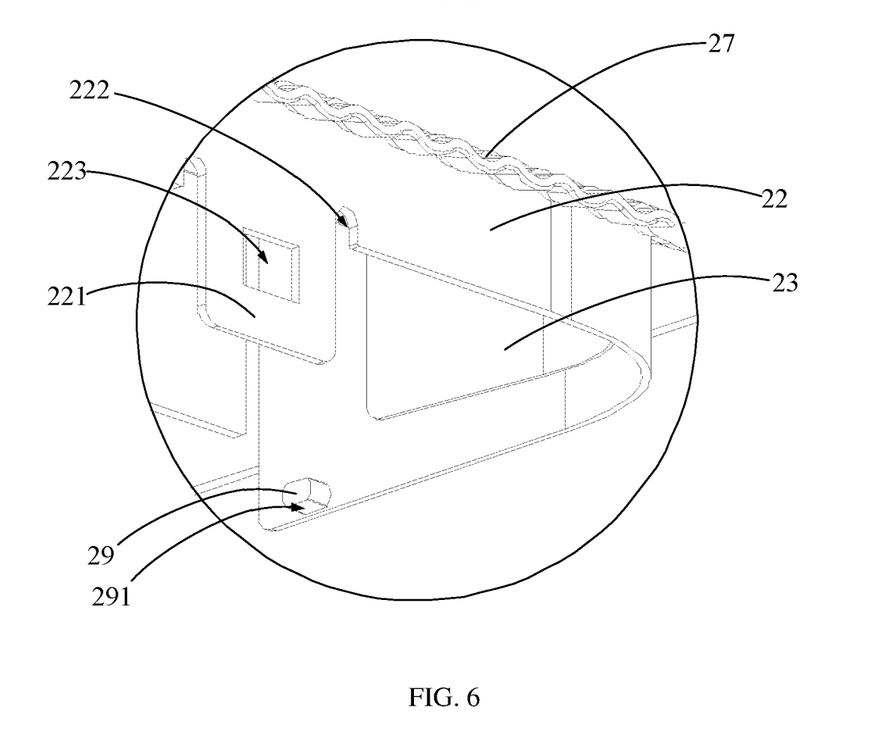
FIG. 6 is an enlarged view of part B in FIG. 3.

Further, the first fixing plate 22 partially extends downward from the elastic plate 221, the buckle hole 223 is arranged on the elastic plate 221, the first fixing plate 22 on two sides of an end portion of the elastic plate 221 is recessed to form a movable groove 222 for the elastic movement of the elastic plate 221, and the movable groove 222 can effectively prevent the elastic plate 221 from being broken in the deformation process, so that the structural stability of the elastic plate 221 is improved.

Further, as shown in FIGS. 1 to 4, the storage bin 10 comprises a housing 14 and a mounting plate 15, the housing 14 and the mounting plate 15 enclose the storage bin 10, a bottom of the mounting plate 15 extends towards the feeding cavity 31 to divide the feeding cavity 31 into a storage chamber 311 communicated with the storage bin 10 and a feeding chamber 312 for feeding, and the mounting plate 15 is provided with a discharge hole 151 communicated with the storage chamber 311 and the feeding chamber 312. In this embodiment, the housing 14 and the mounting plate 15 are side wall structures of the storage bin 10, the shape of the housing 14 is adapted to an opening of the tray 30 and is fixedly connected to the tray 30, the mounting plate 15 is fixedly connected to the housing 14, the mounting plate 15 extends downward to divide the feeding cavity 31 into a storage chamber 311 and a feeding chamber 312, the discharge hole 151 is arranged at the bottom of the mounting plate 15 and is used to communicate with the storage chamber 311 and the feeding chamber 312, and one side of the discharge hole 151 facing the feeding cavity 31 penetrates through the mounting plate 15.

Figure 1:
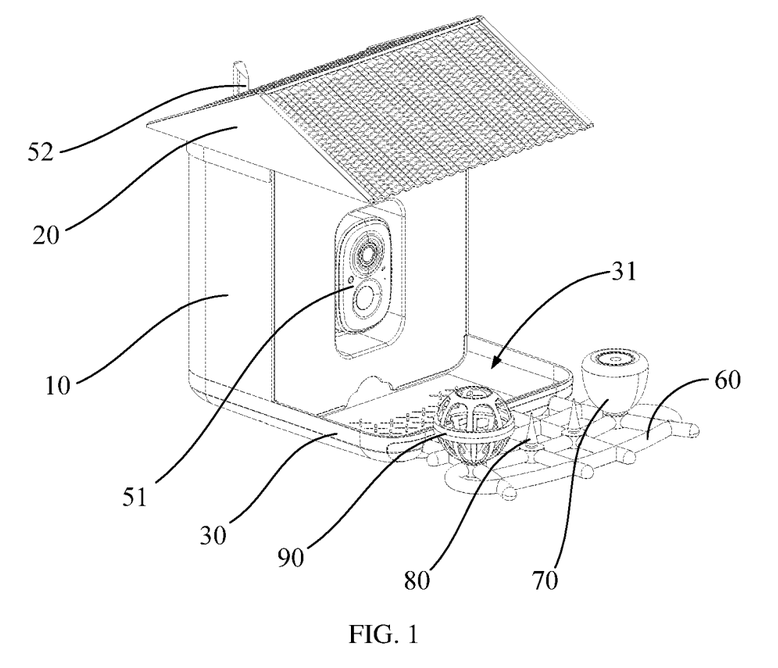
FIG. 1 is a schematic diagram of a structure of an embodiment of an intelligent bird feeding observation device according to the present utility model.
Figure 2:
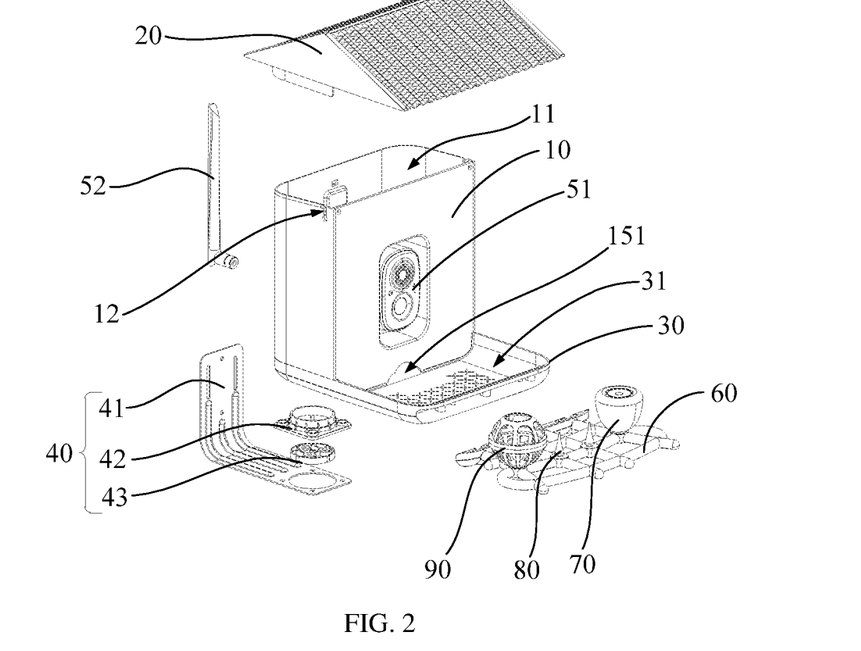
FIG. 2 is a schematic diagram of a structure of a decomposition state of an intelligent bird feeding observation device according to the present utility model from an angle.
Figure 3:
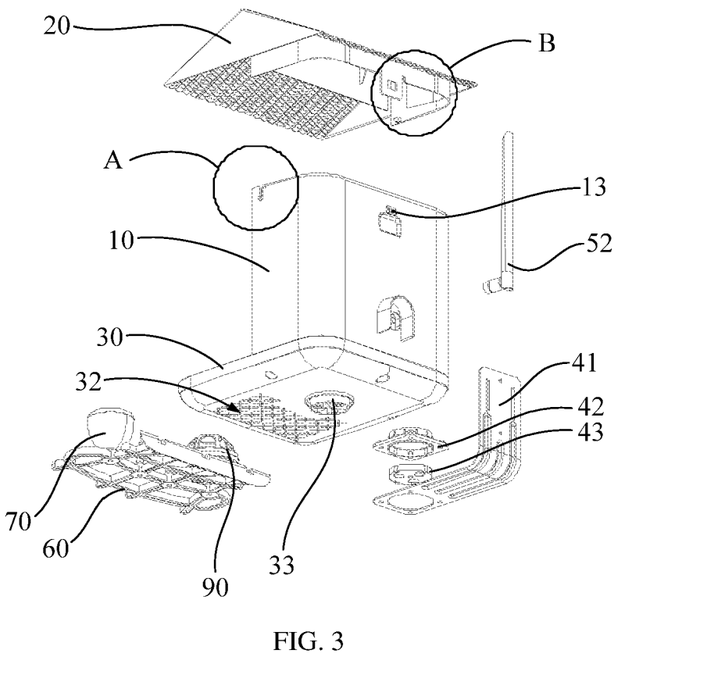
FIG. 3 is a schematic diagram of a structure of a decomposition state of an intelligent bird feeding observation device according to the present utility model from another angle.

In addition, a plurality of water permeable holes 32 are arranged on the bottom wall of the feeding chamber 312 to prevent water from accumulating in the feeding chamber 312.

Further, as shown in FIGS. 1 to 4, a middle of the mounting plate 15 is recessed to form a mounting groove 152, the camera module comprises a control module and a camera 51 electrically connected to the control module, and the control module and the camera 51 are arranged in the mounting groove 152. In this embodiment, the middle of the mounting plate 15 is recessed toward the inside of the storage bin 10 to form a mounting groove 152, and the mounting groove 152 is used to mount the camera 51, so as to prevent the camera 51 from being damaged by external factors.

The control module is used to control the camera 51 to rotate and receive the image information photographed by the camera 51.

In addition, the camera module further comprises a wireless transmission module that is electrically connected to the control module. Through the wireless transmission module, the observation device can be in wireless communication with other devices to implement the connection with a smart phone, a tablet computer, or other display terminal devices. The user can remotely observe the situation of the birds in real time through the mobile phone App or other display devices, so that the practicability of the observation device is effectively improved.

Further, the camera module further comprises an antenna module 52, the housing 14 is provided with a mounting hole communicated with the mounting groove 152, and the antenna module 52 is arranged on an outer wall of the housing 14 and electrically connected to the control module through the mounting hole. In this embodiment, the antenna module 52 is used to increase the transmission power of the control module to improve the transmission stability of the observation device.

Further, the camera module further comprises a driving assembly electrically connected to the control module, and the driving assembly is used to drive the camera 51 to rotate. In this embodiment, the driving assembly is used to drive the camera 51 to rotate, so as to increase a photographing angle and a photographing range of the camera 51. Specifically, the driving assembly is electrically connected to the control module, so that a user can transmit a control signal to the control module so as to control the driving assembly to drive the camera 51 to rotate. The driving manner is not limited herein.

Further, as shown in FIGS. 2 to 4, 8, and 9, the observation device further comprises a rotating assembly 40, the rotating assembly 40 comprises a fixed support 41, a first rotating member 42 arranged on the fixed support 41, and a second rotating member 43 rotatably matched with the first rotating member 42, and the second rotating member 43 is fixed to a bottom of the tray 30 so as to rotate the tray 30 relative to the fixed support 41. In this embodiment, the rotating assembly 40 is a component for changing an observation area of the observation device, the fixed support 41 is a fixed structure of the observation device, the observation device is fixed on a tree, a wall surface or other mounting places through the fixed support 41, the first rotating member 42 and the second rotating member 43 are used to rotate the tray 30 relative to the fixed support 41, so as to change the observation area of the observation device. Specifically, the first rotating member 42 is fixedly connected to the fixed support 41, the second rotating member 43 is fixedly connected to the tray 30, and the first rotating member 42 and the second rotating member 43 are rotatably connected with each other, so that the tray 30 can rotate relative to the fixed support 41, thereby effectively improving the practicability of the observation device.

Figure 8:
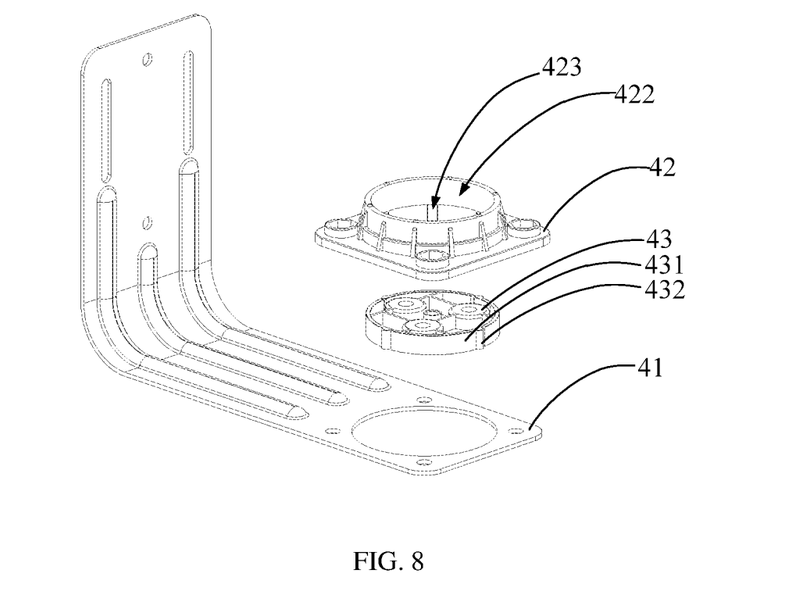
FIG. 8 is a schematic diagram of a structure of a rotating assembly.
Figure 9:
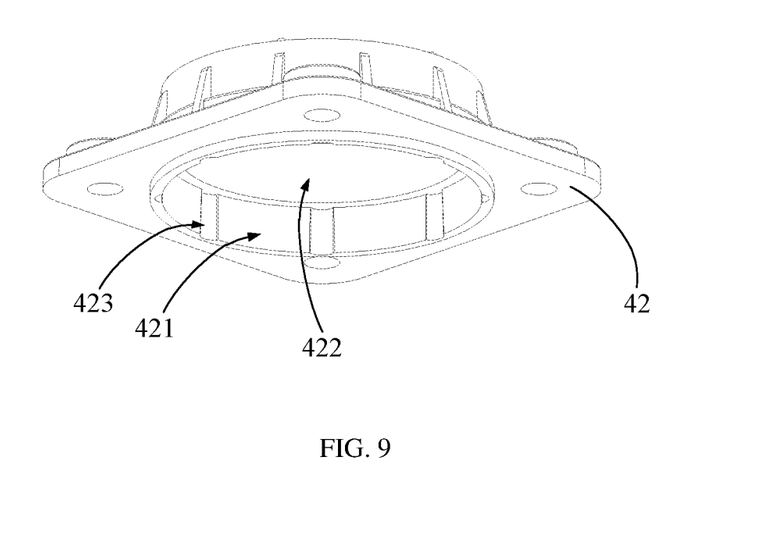
FIG. 9 is a schematic diagram of a structure of a first rotating member.

Further, the second rotating member 43 is cylindrical, the first rotating member 42 is provided with a rotating groove 421 adapted to the second rotating member 43, a bottom of the rotating groove 421 is provided with a fixing hole 422, and the second rotating member 43 is fixedly connected to the tray 30 through the fixing hole 422. Specifically, the fixed base 33 is convexly arranged at the bottom of the tray 30, one end of the first rotating member 42 is sleeved on the fixed base 33 through the fixing hole 422, and the second rotating member 43 is arranged in the rotating groove 421 and is fixedly connected to the fixed base 33, so as to fix the first rotating member 42 on a periphery of the fixed base 33. It should be explained that the cross-sectional diameter of the first rotating member 42 is greater than a diameter of the fixing hole 422, and meanwhile, the other end of the first rotating member 42 is relatively fixed to the fixed support 41, so that the tray 30 and the second rotating member and the first rotating member 42 and the fixed support 41 are relatively fixed, and the first rotating member 42 and the second rotating member 43 are rotatably connected, so that the tray 30 and the fixed support 41 can rotate relatively.

Further, as shown in FIGS. 2 to 4, 8, and 9, an outer wall surface of the second rotating member 43 is provided with at least one fixed elastic piece 431, the fixed elastic piece 431 is provided with a clamping block 432 protruding from the outer wall surface of the second rotating member 43, and an inner wall surface of the rotating groove 421 is provided with a plurality of clamping grooves 423 at intervals for matching with the clamping block 432. In this embodiment, the fixed elastic piece 431 is used to relatively fix the first rotating member 42 and the second rotating member 43. Specifically, a fixed elastic piece 431 is formed on the outer wall of the second rotating member 43 through an opening, a clamping block 432 is arranged on the outer wall that is of the movable end of the fixed elastic piece 431 and that is far away from the midpoint of the second rotating member 43, meanwhile, a plurality of clamping grooves 423 are arranged on the inner wall surface of the rotating groove 421 of the first rotating member 42 at intervals. When the first rotating member 42 and the second rotating member 43 rotate relatively, the clamping block 432 on the fixed elastic piece 431 is squeezed by the inner wall of the rotating groove 421 to enable the movable end of the fixed elastic piece 431 to swing towards the center of the second rotating member 43, so that the first rotating member 42 and the second rotating member 43 are not limited to rotate relatively, and when the clamping block 432 of the fixed elastic piece 431 rotates to the clamping groove 423, the clamping block 432 is embedded with the clamping groove 423, so that the first rotating member 42 and the second rotating member 43 are relatively fixed, and the tray 30 and the fixed support 41 are relatively fixed.

Further, as shown in FIGS. 1 to 4, the observation device further comprises a standing frame 60, and the standing frame 60 is fixed to one side of the tray 30. In this embodiment, the standing frame 60 is used for birds to rest and eat, and is arranged in the photographing area of the camera 51 and fixed on a side wall of the tray 30.

Further, the observation device further comprises at least one honey pot 70, at least one fixed thorn 80 and at least one food cage 90, and the honey pot 70, the fixed thorn 80 and the food cage 90 all are provided on the standing frame 60. In this embodiment, the honey pot 70, the fixed thorn 80 and the food cage 90 are all arranged on an upper portion of the standing frame 60, wherein the honey pot 70 is used to contain liquid for the birds to drink, the fixed thorn 80 are used to place fruit food for the birds to eat, the food cage 90 is used to place a suet ball or other large food for the birds to eat, and the cage design can effectively prevent the birds from taking the food out of the observation area to affect the observation.

In addition, the number of the honey pots 70, the fixing thorns 80 and the food cages 90 is not limited herein, and is set based on a size of the observation device and an actual requirement.

The above mentioned contents are only optional embodiments of the present utility model and are not intended to limit the patent scope of the present utility model, and under the inventive concept of the present utility model, the equivalent structural transformations made by using the contents of the specification and the drawings of the present utility model, or direct/indirect applications to other related technical fields, are all included in the patent protection scope of the present utility model.

What is claimed is:

1. An intelligent bird feeding observation device, comprising:
- a storage bin, wherein a top of the storage bin is provided with a feed inlet, and two opposite sides of the storage bin are provided with a sliding groove of which one end penetrates through the storage bin;
- a cover body, wherein the cover body is movably covered on the feed inlet of the storage bin through a rotating shaft, and the rotating shaft is positioned in the sliding groove;
- a tray, wherein the tray is arranged at a bottom of the storage bin, the tray is provided with a feeding cavity with an opening at the top, and the storage bin covers part of the feeding cavity and is communicated with the feeding cavity; and
- a camera module, wherein the camera module is arranged on the storage bin and photographs towards the feeding cavity of the tray;
- wherein the sliding groove comprises a track groove with one end penetrating through the storage bin and a limiting groove communicated with the other end of the track groove, and the limiting groove has a diameter that is greater than a width of the track groove; and
- a shape of the rotating shaft is adapted to the limiting groove, and a side wall of the rotating shaft has at least one limiting surface adapted to the track groove.

2. The intelligent bird feeding observation device according to claim 1, wherein the sliding groove is arranged downwards from the top of the storage bin, and the limiting groove is positioned at a bottom of the track groove.

3. The intelligent bird feeding observation device according to claim 2, wherein the cover body has a covering surface covering the feed inlet, and the limiting surface is arranged parallel to the covering surface.

4. The intelligent bird feeding observation device according to claim 3, wherein the cover body comprises a first fixing plate adapted to a shape of the storage bin, the rotating shaft is arranged on an inner wall of the first fixing plate, and the first fixing plate is attached to an outer wall of the storage bin and extends downward.

5. The intelligent bird feeding observation device according to claim 4, wherein the cover body comprises a second fixing plate adapted to a shape of the feed inlet, the second fixing plate is attached to an inner wall of the storage bin and extends downward, and the storage bin around the feed inlet is positioned between the first fixing plate and the second fixing plate.

6. The intelligent bird feeding observation device according to claim 5, wherein the cover body further comprises a first covering plate covering the feed inlet and a second covering plate connected to the first covering plate, and the first fixing plate and the second fixing plate are fixed onto the first covering plate.

7. The intelligent bird feeding observation device according to claim 6, wherein the cover body further comprises triangular fixing plates arranged on opposite sides of the first covering plate and the second covering plate, and two adjacent short sides of the triangular fixing plates are fixedly connected to the first covering plate and the second covering plate, respectively.

8. The intelligent bird feeding observation device according to claim 4, wherein the first fixing plate is provided with a buckle hole, and the storage bin is provided with a buckle that is matched with the buckle hole.

9. The intelligent bird feeding observation device according to claim 2, wherein the storage bin comprises a housing and a mounting plate, the housing and the mounting plate enclose the storage bin, a bottom of the mounting plate extends towards the feeding cavity to divide the feeding cavity into a storage chamber communicated with the storage bin and a feeding chamber for feeding, and the mounting plate is provided with a discharge hole communicated with the storage chamber and the feeding chamber.

10. The intelligent bird feeding observation device according to claim 9, wherein a middle of the mounting plate is recessed to form a mounting groove, the camera module comprises a control module and a camera electrically connected to the control module, and the control module and the camera are arranged in the mounting groove.

11. The intelligent bird feeding observation device according to claim 10, wherein the camera module further comprises an antenna module, the housing is provided with a mounting hole communicated with the mounting groove, and the antenna module is arranged on an outer wall of the housing and electrically connected to the control module through the mounting hole.

12. The intelligent bird feeding observation device according to claim 11, wherein the camera module further comprises a driving assembly electrically connected to the control module, and the driving assembly is used to drive the camera to rotate.

13. The intelligent bird feeding observation device according to claim 1, wherein the observation device further comprises a rotating assembly, the rotating assembly comprises a fixed support, a first rotating member arranged on the fixed support, and a second rotating member rotatably matched with the first rotating member, and the second rotating member is fixed to a bottom of the tray so as to rotate the tray relative to the fixed support.

14. The intelligent bird feeding observation device according to claim 13, wherein the second rotating member is cylindrical, the first rotating member is provided with a rotating groove adapted to the second rotating member, a bottom of the rotating groove is provided with a fixing hole, and the second rotating member is fixedly connected to the tray through the fixing hole.

15. The intelligent bird feeding observation device according to claim 14, wherein an outer wall surface of the second rotating member is provided with at least one fixed elastic piece, the fixed elastic piece is provided with a clamping block protruding from the outer wall surface of the second rotating member, and an inner wall surface of the rotating groove is provided with a plurality of clamping grooves at intervals for matching with the clamping block.

16. The intelligent bird feeding observation device according to claim 14, wherein the bottom of the tray is provided with a fixed base, and the second rotating member is fixed to the fixed base.

17. The intelligent bird feeding observation device according to claim 1, wherein the observation device further comprises a standing frame, and the standing frame is fixed to one side of the tray.

18. The intelligent bird feeding observation device according to claim 17, wherein the observation device further comprises at least one honey pot, at least one fixed thorn and at least one food cage, and the honey pot, the fixed thorn and the food cage all are provided on the standing frame.

* * * * *